United States Patent [19]
Despalmes

[11] 3,918,682
[45] Nov. 11, 1975

[54] TRANSPORTING AND LIFTING VEHICLE FOR HEAVY LOADS

[75] Inventor: Friedrich Despalmes, Vienna, Austria

[73] Assignee: Vereinigte Osterreichische Eisen- und Stahlwerke - Alpine Montan Aktiengesellschaft, Linz, Austria

[22] Filed: Jan. 18, 1974

[21] Appl. No.: 434,635

[30] Foreign Application Priority Data
Feb. 15, 1973 Austria ............................... 1337/73
July 23, 1973 Austria ............................... 6470/73

[52] U.S. Cl. ................... 254/87; 105/157; 105/177; 214/1 D
[51] Int. Cl.² ...... B60S 9/14; B61F 5/00; B25J 5/02; C21C 1/00
[58] Field of Search ............. 254/87, 93 R; 214/1 D, 214/38; 105/157, 177

[56] References Cited
UNITED STATES PATENTS

| | | |
|---|---|---|
| 3,396,674 | 8/1968 | Tani ............................... 105/157 R |
| 3,408,950 | 11/1968 | Puhringer ........................... 105/177 |
| 3,434,606 | 3/1969 | Asamura............................. 105/177 |
| 3,531,005 | 9/1970 | McCready et al. .................. 105/177 |
| 3,593,859 | 7/1970 | Spannlang et al. .................. 105/177 |
| 3,715,101 | 2/1973 | Puhringer ............................ 214/1 D |
| 3,718,265 | 2/1973 | Trost.................................. 214/1 D |
| 3,741,407 | 6/1973 | Spannlang............................ 214/1 D |

FOREIGN PATENTS OR APPLICATIONS

1,433,664 11/1968 Germany ........................... 105/177

*Primary Examiner*—Othell M. Simpson
*Attorney, Agent, or Firm*—Brumbaugh, Graves, Donohue & Raymond

[57] ABSTRACT

A transporting and lifting vehicle for heavy loads, e.g. converter exchange vessels used in steel production. The vehicle is provided with a travelling frame, which is rotatable into different directions of travel. A lifting-rotating mechanism is built into the travelling frame, but is not mechanically connected therewith. This lifting-rotating mechanism is liftable, lowerable, rotatable about a central axis and supportable on the ground. It consists of at least two, preferably three, closed concentric rotating frames, which are rotatable towards each other. These rotating frames are constructed in such a way that each rotating frame can be supported by the travelling frame in one angular position and can pass through the traveling frame in another angular position. The rotating frames are in the form of rings or polygons and have radial projections or flanges. Extendable and retractable lifting means, preferably hydraulic differential pistons, whose lifting height is smaller than the total lifting height of the load, are arranged on one of the rotating frames.

20 Claims, 15 Drawing Figures

TRANSPORTING AND LIFTING VEHICLE FOR HEAVY LOADS

BACKGROUND OF THE INVENTION

The invention relates to a transporting and lifting vehicle for heavy loads and, more particularly, to a transporting and lifting vehicle for converter exchange vessels used in the production of steel. In a typical steel plant vehicles, that travel on rails are used for lowering the converter from the blowing stand so that it may be relined from time to time. The vehicle transports the converter to a distant lining and repair stand and lifts it into that stand.

The converter is replaced by a spare vessel, which is lifted into the blowing stand by means of the transporting and lifting vehicle, so that the steel production need not be unduly interrupted.

Since the converter vessels of today have considerable dimensions and a further increase in size is to be expected, the transporting and lifting vehicles are among the largest load-lifting vehicles in existence as far as their carrying capacity and their dimensions are concerned. Also, they are among the most complicated vehicles of their type with respect to guiding the loads and keeping them in control.

The demands a transporting and lifting vehicle has to meet are essentially the following:

Although the outer dimensions have to be restricted due to the limited space, the carrying capacity must be large in proportion to the dead weight. The transporting and lifting vehicle should be capable of altering its travelling direction by an angle without the need for additional devices, such as turntables or other auxiliary devices which do not form part of the vehicle. In addition the lifting height of the vehicle must be great, especially for converters with closed carrying rings, and the lowest load position has to be as close as possible above the level, i.e. the upper edges of the rail track. The vehicle should be in this low position when transporting the load in view of higher installations, such as platforms, and in order to achieve a low center of gravity for the load, thus creating a greater stability for the vehicle. Before and while introducing the converter into the carrying ring, i.e. while the load is in the upper lifting range, the vehicle should advantageously be capable of carrying out adjusting movements. In particular one shall be able to turn the converter a small distance around its axis to, respectively displace it in the direction of the rails and perpendicular to them, so that the converter takes a position corresponding to the converter bearing zones of the carrying ring. The introduction and removal of the converter from the converter bearing zones must be achieved with the least constraint possible because the resulting directing forces may become rather strong when the converter is not in a position completely corresponding to the receiving construction, which would cause the vehicle, the converter and the carrying ring to be under heavy stress. Another requirement is that the converter, after having been removed from the blowing stand and having been transported to the lining or repair stand, should be liftable there in any angular position in relation to the converter axis; i.e. the vehicle should have the capability of imparting to the converter a rotatory motion around the converter axis.

The known transporting and lifting vehicles do not meet these demands or they are too heavy and complicated, and require additional devices.

For example, in the German Auslegeschrift No. 1,186,481 a load lifting vehicle is described, which for the transposition at track intersections necessitates, apart from the proper lifting vehicle, a receiving vehicle, into whose carrying frame, which is open on one side, the converter is introduced by the lifting vehicle.

From U.S. Pat. No. 3,434,606 a vehicle is known, which requires at the track intersections additional lifting devices built into the floor for carrying out the necessary rotatory movements.

From U.S. Pat. No. 3,396,674 a transporting and lifting vehicle is known, which requires lifting devices on the vehicle frame for lifting the load and needs additional lifting devices on the lifting frame for lifting the vehicle frame when carrying out rotatory movements above the track intersections.

From British Patent Specification No. 1,137,532 a vehicle is known, which also needs, apart from lifting devices for lifting the load and apart from additional devices for lifting the travelling frame, rotating bogies for carrying out direction alterations at track intersections.

In the German Auslegeschrift No. 1,147,962 a vehicle is described, whose extractable telescopic lifting devices are firmly connected with the chassis and are supported by it. This vehicle is not capable of carrying out adjusting movements around the converter axis or transversely to the travelling direction in the high position of the converter and neither is it capable of carrying out direction alterations at track intersections.

German Auslegeschrift No. 2,023,965 describes a railbound transporting and lifting vehicle, whose central supporting structure has a carrying frame connected with the vehicle frame, which carries the running wheels via a pivot bearing. In the lifted position of the supporting structure, which lies beneath the carrying frame and thus beneath the converter, the vehicle frame is rotatable around the supporting structure. This makes possible direction alterations at track intersections. Moreover, the carrying frame is rotatable together with the converter, while the supporting structure is in the lowest possition of the converter, i.e. when the carrying frame rests on the rails. This vehicle may be used only for minor lifting heights because in its lowered position the maximum space available for the lifting devices is between the lower edge of the converter and the floor. A rotation around the converter axis is possible in the lowered position, but not in a lifted position, when the converter is being installed into its holding device. The supporting structure must be constructed particularly sturdily because apart from the load the entire vehicle is lifted.

From the German Auslegeschrift No. 1,433,664 a transporting and lifting vehicle for refining vessels is known, which consists of a frame with lifting and lowering devices and a chassis arranged to be horizontally rotatable in the frame. The chassis is provided with a carrying means for receiving the refining vessel. Although with this vehicle it is possible to carry out direction alterations at track intersections as well as rotations of the carrying means and the refining vessel around its axis, correction movements in the longitudinal direction of the tracks are possible only via additional devices because the lifting device is supported by the foundation. With this model, the lifting devices must be constructed particularly robust, as the weight of the vehicle must be lifted as well. With big lifting heights long cylinders are necessary, which create guidance and stability problems.

SUMMARY OF THE INVENTION

The invention aims at avoiding the above mentioned disadvantages by building a transporting and lifting vehicle that meets the previously mentioned requirements and represents a particularly simple, operationally reliable and economical construction.

Thus the invention is a transporting and lifting vehicle for heavy loads, particularly for converter exchange vessels used in steel production. The vehicle has a travelilng frame that is rotatable into different directions of travel during transposition. A lifting-rotating mechanism, that is rotatable about a central axis, liftable and lowerable, and supportable on the ground, is inserted within the travelling frame, but is not mechanically connected with it. The lifting-rotating mechanism has at least two, preferably three closed, concentric rotating frames, that are rotatable relative to each other. These rotating frames are constructed in such a way that each rotating frame can be supported on the travelling frame in one angular position and can pass through this frame, in another angular position. Extendable and retractable lifting means, whose lifting height is smaller than the total lifting range of the load and which are preferably hydraulic differential pistons, are arranged on one of the rotating frames. In a lifting-rotating mechanism with three concentric rotating frames the lifting means are arranged on the second (middle) rotating frame.

Between the travelling frame and the lifting-rotatng mechanism, flexible supply or control-lines can be provided.

The lifting height of the lifting means may be somewhat greater than half the total lifting range of the load. The lifting-rotating mechanism, as described in detail later on, is supported by either the foundation or the travelling frame and ascends in a stepwise manner to achieve the required total lifting range.

According to a preferred embodiment of the invention, the rotating frames are in the form of rings or polygons and have radial projections or flanges. When the vehicle is in the transporting position, the flanges of the third (highest) rotating frame are supported on the travelling frame. After the first lifting phase the flanges of the first (lowest) rotating frame are supported on the travelling frame and in the second lifting phase the lifting means connected with the projections of the second (middle) rotating frame are also supported on the travelling frame.

The rotating frames are advantageously connected by means of an axial bearing acting bilaterally and are rotatable optionally together or individually by means of a single tooth wheel rim or several tooth wheel rims or the like.

As axial bearings, roller bearings or ball rotation connections are preferred. As lifting means, at least three and preferably four hydraulic cylinders with doubly acting pistons, which are mounted on radial projections of the second rotating frame are provided. Instead of the differential pistons, threaded spindles, which are capable of accommodating both compression and tensile forces, may also be used.

At the lower end of the lifting means foot plates be provided, which make it possible to transfer the loads to be lifted both to the foundation and, in the further course of the lifting procedure, onto the supporting surfaces of the longitudinal beams and the cross beams of the vehicle frame. These foot plates may be arranged at the ends of the lifting means in such a way that, apart from being able to transfer compression forces downwardly, they are also capable of transferring upwardly the tensile forces of the lifting means acting in the opposite direction and the forces acting horizontally.

The vehicle frame is advantageously provided with engagement means, which can be pushed or swung out to establish a temporary mechanical connection with the lifting means during transposition.

For this connection the upper side of the above mentioned foot plates can be provided with, e.g. prismatically or cylindrically formed, supporting surfaces for a bolt-shaped engagement means, the receiving points thus forming stops for these bolts on the foot plates in the vertical and radial directions, relative to the rotating axis of the lifting-rotating mechanism.

The first and the third rotating frame are each suitably provided with drives of their own, i.e. pinions and pertaining motors, that are firmly connected with the second rotating frame. They are suitably carried in a common bearing housing.

The drive of the travelling frame and of the third rotating frame are advantageously provided with an automatic brake which is releasable, while the load is being adjusted into its stationary reception device. With this provision the otherwise automatically acting braking of the pinion, that drives the third rotating frame and the brake of the drives of the travelling frame, should be neutralizable from the driver's stand of the vehicle in the last range of the lifting procedure, but not before the lifting means rest on the travelling frame.

The travelling frame may be formed by two longitudinal beams and two cross beams, which surround an opening, through which each rotating frame can pass in a certain angular position. The height of the supporting surfaces on the travelling frame is smaller than the lifting range of the lifting means, measured from the upper edge of the track.

According to the invention it is also possible to arrange aggregates, as e.g. motors and pumps, for creating the lifting movements of the lifting means and the rotating movements of the rotation drives of the lifting-rotating mechanism, and also a driver's stand with the control devices, directly on the lifting-rotating mechanism. Moreover, it is possible to install these aggregates in a machine and control housing, which is firmly connected with the vehicle frame, and to actuate the lifting and rotating means of the lifting-rotating mechanism from the housing via flexible supply conduits and control lines leading to the lifting-rotating mechanism.

In a preferred embodiment of the invention an adjusting frame having a drive of its own and arranged eccentrically on the third rotating frame is provided for carrying out adjusting movements of the load in relation to its reception device. This new constructive solution avoids the disadvantages of known shunting devices that are equipped with sliding tracks transversely to the travelling direction and, hence, maintenance, lubrication, etc. are not longer necessary.

Since the adjusting frame is arranged eccentrically, the displacement of the load can be carried out by mere rotatory movements.

The adjusting frame, as well as the other frames, may be provided with a tooth wheel rim and a pinion with a drive of its own, the pinion being supported by the third ring. Here an automatic brake, which is releasable in the last stage of the lifting phase after the lifting pistons have been supported, can also be provided so that the converter may be introduced into the bearing zones without braking.

According to a constructionally simplified embodiment of the invention, it is possible to construct a lifting-rotating mechanism, consisting of only two concentric rotating frames. The rotating frames are in the form of rings or polygons with the first rotating frame being provided with radial flanges and the second rotating frame being provided with radial flanges and projections. In the transport position the flanges of the second rotating frame rest on blocks displaceable from the vehicle frame in the direction of the rotating frames. After the first lifting phase the flanges of the first rotating frame rest on these blocks, and in the second lifting phase the lifting means, which are connected with the projections of the second rotating frame, rest on the travelling frame.

In comparison with the embodiment having three rotating frames, the third rotating frame is missing from this arrangement and the converter rests directly upon the second rotating frame. The converter also carries out the angular turning in the transposition for the second lifting phase. In many cases, particularly when the converter is provided with a carrying-disk suspension, this is spatially possible. If the possibility of adjustment is additionally desired, individual devices which allow movements within certain limits may be provided. In such a case a rotating frame that forms part of the lifting-rotating mechanism, is not necessary.

BRIEF DESCRIPTION OF THE DRAWINGS

The foregoing and further features of the invention are described in more detail with reference to the accompanying drawings in which.

DESCRIPTION OF EXEMPLARY EMBODIMENTS

The travelling frame 1 consists of the longitudinal beams 2 and the cross beams 3, each of which is provided with inward projections 5 situated approximately in the center. onto the travelling frame 1 four running wheel rockers 6 are hinged and they carry the running wheels 7, which can be driven and braked. Moreover, the beams of the frame have extendable bolt-shaped engagement means 8, which can be pushed out into the corners of the opening 9 enclosed by the beams 2 and 3. Reference number 10 indicates a driver's stand arranged on the travelling frame. The vehicle runs on rails 11. In the opening 9 enclosed by the beams 2 and 3, the lifting-rotating mechanism is inserted, which is generally denoted with 13. The lifting-rotating mechanism does not form a mechanical connection, i.e. form-locking or force-locking, with the travelling frame 1, but is only connected thereto by a flexible supply conduit or control line, denoted with 14. As can be seen in detail from FIG. 2, the lifting-rotating mechanism 13 consists of three concentric ring-shaped frames, the first or lower frame 15, the second or middle frame 16 and the third or upper frame 17. These frames are connected with each other in the axial and radial directions by bilaterally acting axial bearings (18 and 19) in such a way that they are capable of carrying out common rotatory movements in the horizontal plane or rotatory movements relative to each other around a common middle axis. On the first ring-shaped frame 15, a tooth wheel rim 20 is arranged so as to engage a pinion 21. Likewise on the third ring 17 a tooth wheel rim 22 is arranged to engage the pinion 23. Reference number 24 denotes a common bearing and drive housing for both pinions 21 and 23, which housing contains the motors and is fixedly connected with the middle ring 16. As can be seen from FIG. 1, each ring is provided with radial projections or flanges, i.e. the ring 15 has projections 25, the ring 16 with the projections 26, and the ring 17 has projections 27. The projections 27 have the same form as the projections 25. As can be seen from FIG. 1, each ring can when being turned, be put into a position in which the radial flanges 25, 26 or 27 are supported by the inward projections 5 of the beams 2 and 3 or can be put into an angular position within the range of the corners of the opening 9, where they can pass therethrough.

Figure 1:
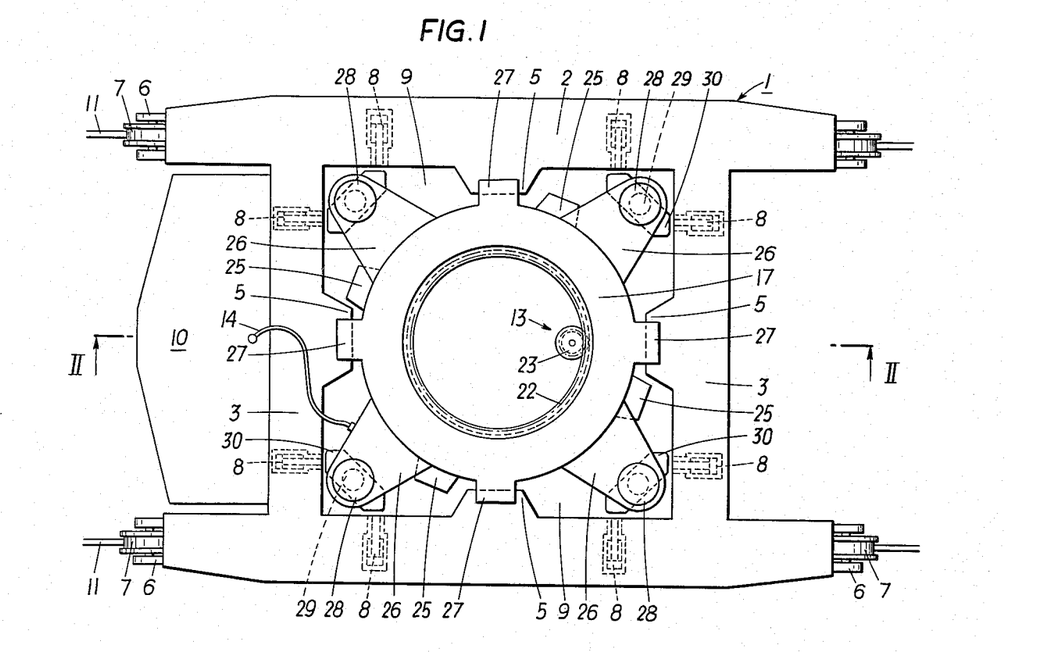
FIGS. 1, 3, 7, 12 and 14 show top views of the transporting and lifting vehicle.
Figure 2:
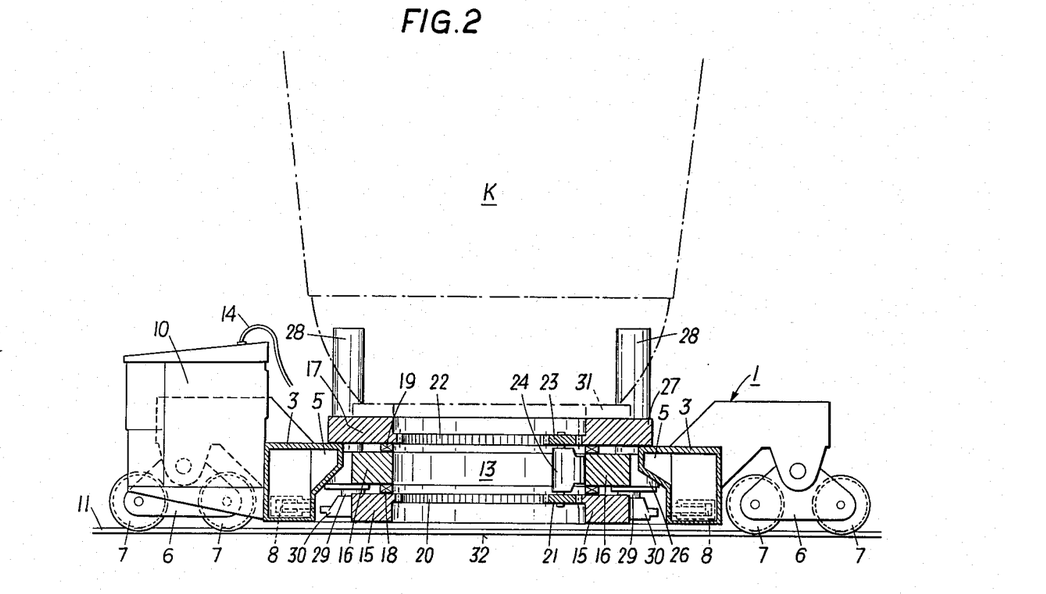
FIGS. 2, 4, 5, 6, 8 are longitudinal sections each along line II—II of FIG. 1.
Figure 3:
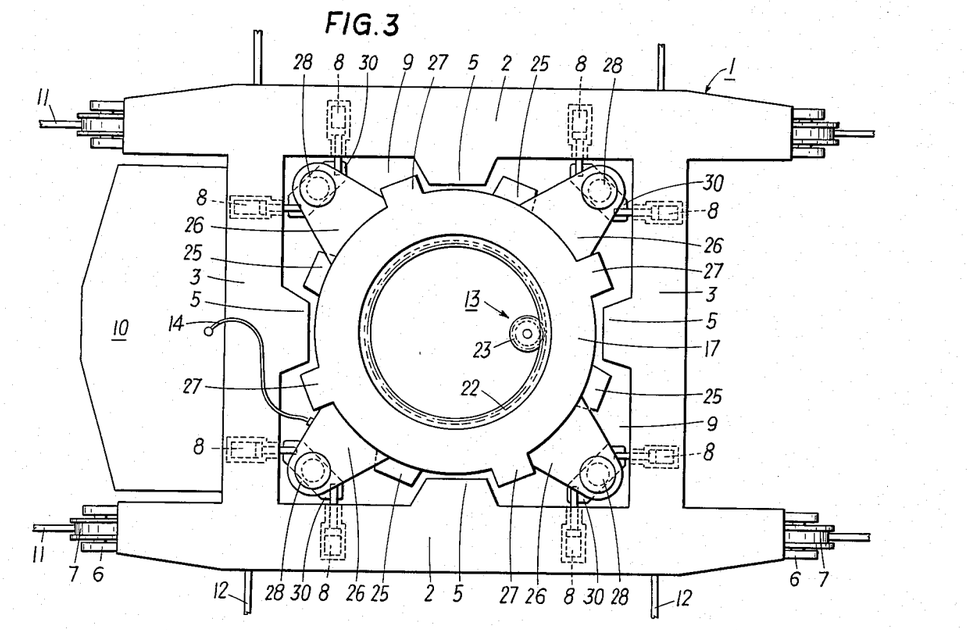

FIGS. 1 and 2 demonstrate the normal transport situation, in which the flanges 27 rest on the projections 5 of the beams. FIG. 3 illustrates an intersection with the rails 12, at which the transporting vehicle is to be transposed and all of the radial projections (25, 26 and 27) are within the range of the corners of the opening 9 during the transposition, so that the lifting-rotating mechanism can pass downward through the opening of the frame. On the frame 16, i.e. on the radial projections 26 thereof, the hydraulic cylinders 28 are secured. Differential pistons 29 together with the piston rods are guided in cylinders 28. At the lower end of the piston rods, the foot plates 30 are arranged. On the upper frame 17, the load receiving device 31 for the converter K is located. The foundation, i.e. the mill floor, is denoted with 32.

FIGS. 1 and 2 illustrate the transport position of the vehicle. In this position, the converter K is carried by the load receiving device 31 and the ring 17 has such an angular position, that it rests on the support zones 5 of the longitudinal and cross beams of the travelling frame. The bolt engagement means 8 are retracted. The other rotating frames 16 and 17 hang over the axial bearings 19 and 18 on the rotating frame 17 and are turned in such a way, that they find room within the space enclosed by the longitudinal beams and cross beams of the travelling frame. The pistons 29 are driven into the hydraulic cylinders 28 so far that the foot plates 30 are lifted sufficiently high above the floor 32. Thus the load and the lifting-rotating mechanism are supported by the travelling frame 1, which in turn is supported by the rails 11 via the rockers 6 and the running wheels 7.

Figure 4:
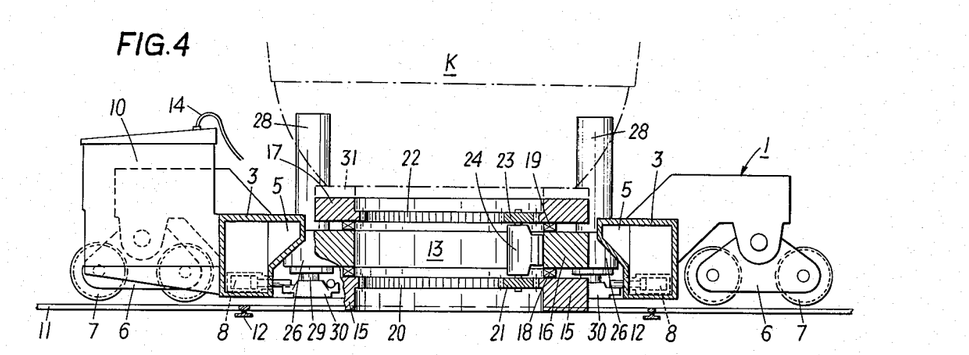

In FIGS. 3 and 4 the transposition of the vehicle at a track intersection from the rails 11 onto the rails 12 is illustrated. According to FIG. 3, the vehicle has been introduced into the track intersection. It has been brought into such a position that the rotation axis of the lifting-rotating mechanism coincides with the axis of the track intersection. Thereafter, the pistons 29 are driven out from the cylinders so far that the foot plates 30 touch the foundation 32. By further driving out the pistons, the lifting-rotating mechanism 13 is lifted a little together with the load, whereby the flanges 27 of the frame 17 are loosened from the travelling frame, thus stopping the piston movement. Since the middle frame 16 is supported by the foundation via the lifting pistons 29 and the foot plates 30, it forms the fixed point for the lifting-rotating mechanism 13. When the pinion 21 is braked the rotating frame 15, the frame 16 and thus the bearing housing 24 are not moved. Then the tooth wheel rim 22 and, consequently, the upper frame 17 together with the load-receiving device and the converter are turned, when the pinion 23 is driven. This pinion is driven until the frame 17 takes a position, in which it is possible to lower it into the opening 9. When the device is in the position shown in FIG. 3, the pistons 29 are again driven into the cylinders 28, causing the lifting-rotating mechanism together with the load to be lowered until the ring 15 rests on the foundation 32. Then the piston movement is stopped. After this the bolts 8 carried by the travelling frame 1 are extended and the introduction of the pistons 29 into the cylinders 28 is continued. As a result the foot plates 30, which lift from the foundation 32, engage with the bolts 8 while being lifted. When the pistons are further retracted, the travelling frame 1 together with all the installations arranged on it i.e. the running wheel rockers and the running wheels, are lifted until the vehicle is freely rotatable. In this position the frame 15 forms the fixed point, as it is supported by the foundation 32. When the pinion 21 is driven, it turns against the stationary tooth wheel rim 20 of the frame 15 and thus sets the middle frame 16 into a rotatory movement via the bearing and drive housing 24, that are connected with the middle frame. At the same time, the frame 16 causes the travelling frame 1 with all its installations and bogies to follow the rotatory movement by means of the bolt 8, the pistons 29 and their foot plates 30. In this transposition phase, the movement of the ring 17, together with the load-receiving device 31 and the converter K, is also effected via the bearing housing 24, when the pinion 23 is braked via the tooth wheel rim 22.

After the transporting and lifting vehicle has been turned into the desired position, the lifting pistons 29 are extracted, whereby the travelling frame is lowered until the running wheels 7 rest on the rails 12. The lifting pistons are then pushed out a little further until the foot plates 30 rest on the foundation 32. After the bolts 8 have been retracted, the pistons 29 are driven out a little more, whereby the lifting-rotating mechanism together with the load is lifted up to a height in which the lower edge of the frame 17 is above the upper edge of the supporting zones of the travelling frame 1. The rotating frame 17, with the frames 16 and 15 standing still, is turned back into its previous position, so that in the course of a subsequent retraction of the pistons 29 that lowers the frame 17, the radial projections 27 of the frame 17 rest again on the supporting zones 5 of the travelling frame. Thus the transport position according to FIG. 1 is again established, but with the vehicle in a direction perpendicular to the first direction, i.e. on rail 12.

Figure 5:
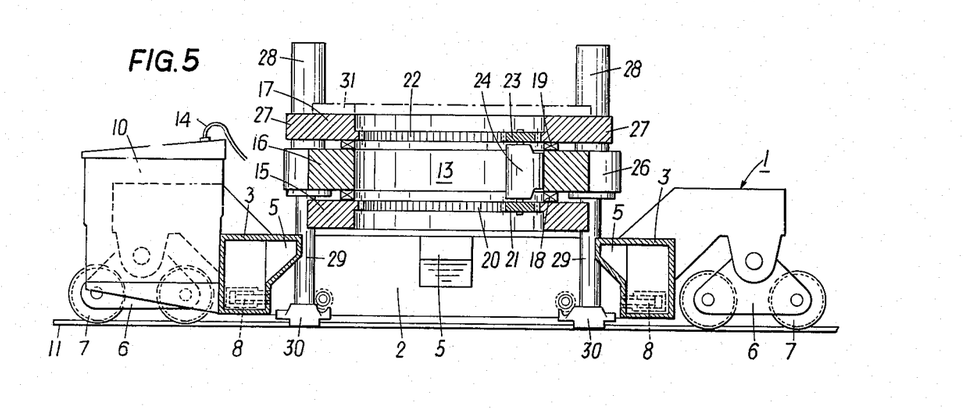
Figure 6:
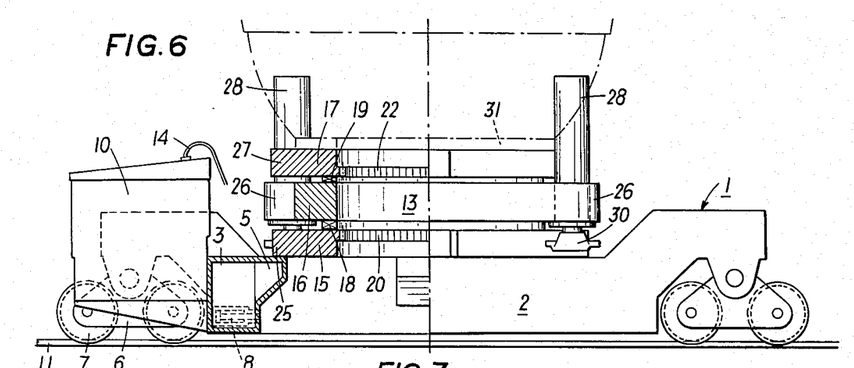

In FIGS. 5 and 6, the first lifting phase of the transporting and lifting vehicle of the present invention is shown. The transporting and lifting vehicle has been driven to another installation area in the above mentioned transporting position and stands below said area. The lifting pistons 29 are driven out of the cylinders 28 until the foot plates 30 touch the foundation 32. When the pistons are driven out further, the lifting-rotating mechanism, together with the load, is lifted via the middle frame 16, up to such a height that the lower edges of the radial projections 25 of the frame 15 lie above the upper edge of the supporting zones 5 of the beams of the travelling frame 1. After this the piston movement is stopped. This situation is illustrated by FIG. 5. In this position the fixed point of the rotatory system of the frames (15, 16 and 17) is the middle frame 16, due to its support on the foundation. Therefore, when the pinion 23 is braked, the frame 17, the frame 16 and hence the bearing housing 24 are unmovable. Then the tooth wheel rim 20 and via it the frame 15 are turned when the pinion 21 is driven. They are turned until the frame 15 takes a position in which the radial projections 25 of the frame 15 are above the supporting zones 5 of the travelling frame. At this point the lifting pistons 29 are subsequently driven in to cylinder 28, lowering the frame 15 onto the travelling frame. When the lifting pistons are driven in further, the foot plates 30 are lifted from the foundation until the lower edges of the foot plates lie above the upper edge of the supporting zones of the longitudinal beams and the cross beams of the travelling frame. Thereafter the piston movement is stopped. The above mentioned situation is illustrated in FIG. 6, which shows half the vehicle in a longitudinal section and the other half in side view. Now the frame 16 is turned. In this position the fixed point of the rotatory system is the frame 15, since it is supported by the travelling frame. When the pinion 21 is being driven, it turns against the stationary tooth wheel rim 20 and sets the frame 16 in motion, together with the cylinders, the lifting pistons and the foot plates, by means of the drive and bearing housing 24 that is firmly connected with the frame 16. In order to that the frame 17, the load receiving device 31 and the converter maintain their previous angular position in relation to the rotation axis during the rotatory movement of frame 16, the pinion 23 is also driven in the same direction as the pinion 21 and with a rate that produces the same angular speed on the frame 17 as is produced by the pinion 21 on the frame 16. With no relative motion between the frames 16 and 17 and with frame 15 stationary, the frame 16 is turned to such a degree that the lifting pistons 29 and their foot plates 30 lie above the supporting zones of the travelling frame.

This procedure ends the first lifting phase. This position is shown in FIGS. 6 and 7.

Figure 7:
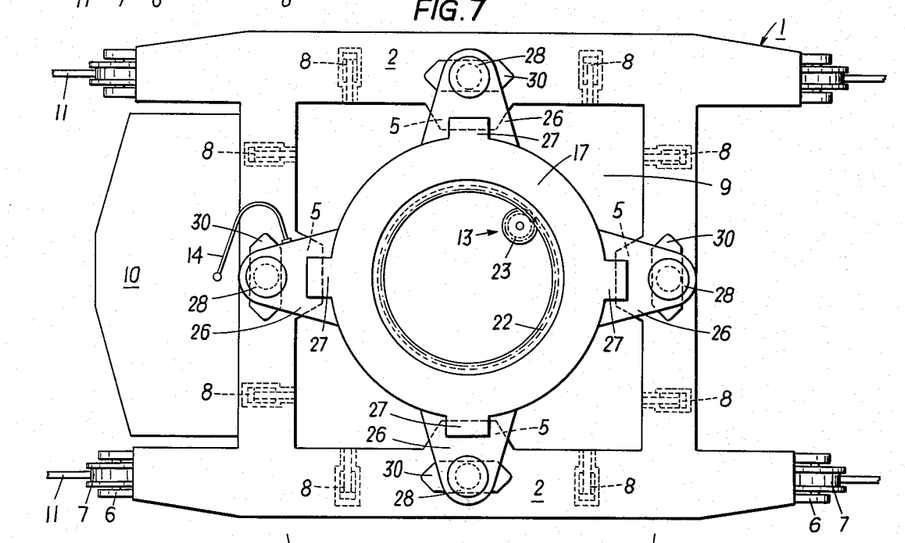

In FIG. 7 the frame 15 is not visible, as its outline coincides with the frame 17.

Figure 8:
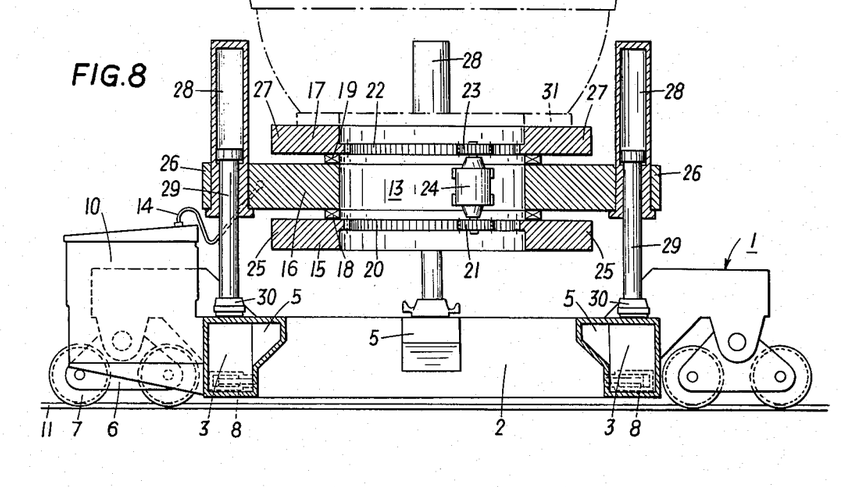

The second lifting phase is started by pushing out the lifting pistons 29, until the foot plates 30 come to rest on the supporting surfaces of the longitudinal beams and the cross beams of the travelling frame. As the pistons are being pushed out further, the lifting-rotating mechanism, together with the load, is lifted by the frame 16. When the position of the converter corresponds with the bearing zones on the waiting carrying ring, the converter is lifted into the carrying ring. The termination of the second lifting phase is illustrated by FIG. 8.

Figure 9:
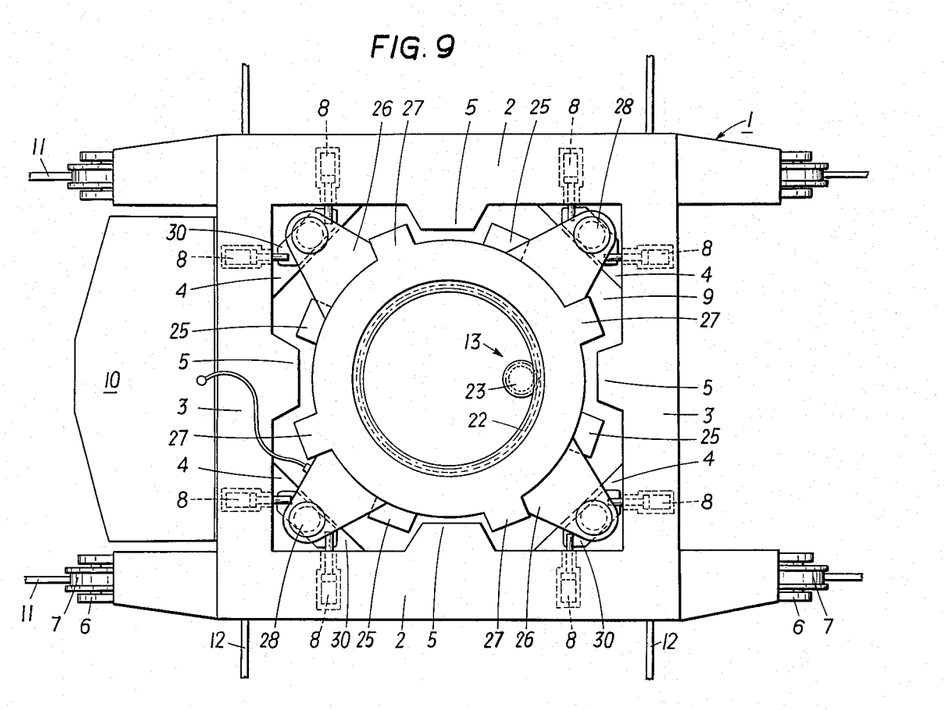
FIGS. 9 and 10 show respectively a top view and a longitudinal section of a modified embodiment during a transposition phase.
Figure 10:
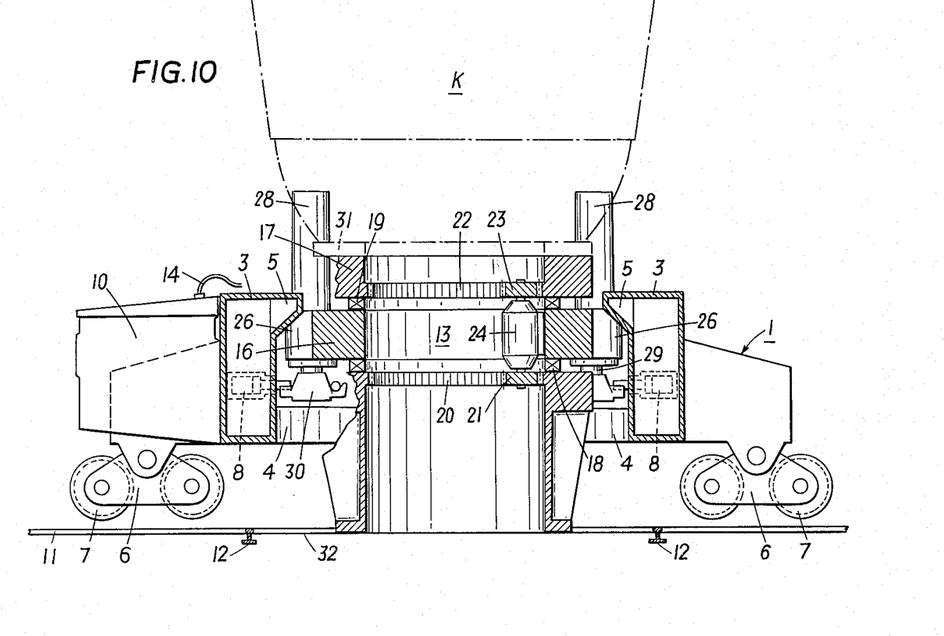

FIGS. 9 and 10 show an advantageous modified embodiment of the transport vehicle of the present invention. Here the travelling frame 1 has, apart from the projections 5, additional inward projections 4, which are provided at the corners of the travelling frame in the lower part of the beams 2 and 3. In the first lifting phase, the lifting means can rest on the projections 4 instead of on the ground as described in connection with the other figures. In the second lifting phase, the lifting means again rest on the upper side of the travelling frame on the projections 5. This embodiment is especially advantageous because, unless the vehicle is transposed at track intersections, the load is diverted immediately onto the rails 11 (12) via the travelling frame 1, the rockers 6 and the running wheels 7. Therefore, expensive foundations at the lifting points are not necessary.

When the converter is being lifted into the bearing zones of the carrying ring, unless the position of the converter corresponds exactly, adjusting movements must be carried out. They are suitably carried out immediately, i.e. before the converter is introduced into the new suspension or carrying ring. Corrections as to the angular position of the converter can be achieved by turning the frame 17, the position of the converter in relation to the rail direcion can be corrected by moving the vehicle, and a correction of the position transversely to the rails is reached by shifting the load receiving device 31. Because even after carrying out these adjusting movements, minor discrepancies in the position of the converter in relation to its bearings on the carrying ring are possible, it is advantageous to eliminate temporarily the braking effect of the running wheels 7 and the pinion 23, while the converter is being introduced into the bearings. This is achieved — according to the type of installation — by either further lifting or lowering the converter slightly so that it may be introduced into the bearings on the carrying ring with the least constraint possible.

When the converter is to be inserted somewhere else in a different angular position, it is possible to turn the converter via the frame 17 in any position in which the pistons 29 are supported either by the foundation 32 or the travelling frame 1.

Figure 11:
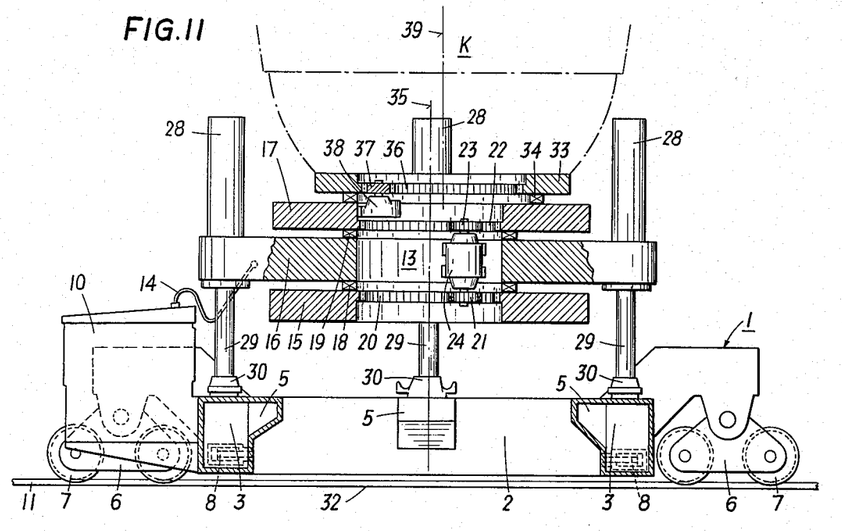
FIG. 11 is a longitudinal section of another modified embodiment of the transporting vehicle of the invention with an additional adjusting device.

FIG. 11 illustrates another preferred embodiment of the transporting and lifting vehicle of the present invention, which makes it easier to carry out adjusting movements. This embodiment provides a frame 33, which forms a load receiving platform, instead of the load receiving device 31. The frame 33 is centrally supported by an axial bearing 34, which in turn connects the frame 33 rotatably with the frame 17, in a position eccentric to the common rotation axis 35 of the rotating frames 15, 16, 17. Reference number 36 denotes a tooth wheel rim which a pinion 37 engages. This tooth wheel rim is firmly connected with the frame 33 and is arranged centrally in relation to the bearing 34. Reference number 38 denotes a bearing and drive housing for the pinion 37, which is secured on the frame 17. With the device described adjusting movements can be carried out. In particular by driving the pinion 23, the frame 17 is turned via the tooth wheel rim 22. When simultaneously turning the adjusting frame 33 at the same angular speed as the frame 17, but in the opposite direction by driving the pinion 37, the frame 33 and the converter swing along a circular path, the center of which lies on the rotation axis of the frame 17 and, consequently, on the rotation axis of the lifting-rotating mechanism. The radius of the circular path corresponds to the degree of eccentricity of the rotation axis 35 of the lifting-rotating mechanism in relation to the rotation ais 39 of the adjusting frame 33. However the original angular position of the frame 33 and the converter in relation to the travelling frame 1 is maintained unaltered during the entire rotation because of the relative movement of the frame 33 in relation to the frame 17.

By means of the above mentioned procedure it is possible to swing the converter into any position transverse to the direction of the rails, while the angular position remains unchanged. The necessary position corrections in the rail direction are carried out by displacing the vehicle together with the load.

Angular position corrections of the converter are effected through the turning the adjusting frame 33 by driving of the pinion 37 via the tooth wheel rim 36, while the frame 17 is braked.

While the converter is being introduced into its bearings, the braking of the running wheels 7 and of the pinions 37 and 23 may be neutralized so that the converter may be introduced into its bearings on the carrying ring with the least constraint possible.

FIGS. 12 to 15 illustrate a vehicle with a lifting-rotating mechanism 13, consisting of only two rotating frames. In these figures the same components are denoted with the same reference numbers as in the previous Figs. As can be observed in detail from FIG. 13, this lifting-rotating mechanism consists of two concentric ring-shaped frames, the first or lower frame 45 and the second or upper frame 46. These frames are connected with each other in the axial and radial direction by bilaterally acting axial bearings 18, so that they are capable of carrying out, in the horizontal plane, common rotatory movements or rotatory movements relative to each other around a common middle axis. On the first frame 45 a tooth wheel rim 20 is secured and it is engaged by a pinion 21. Reference number 47 denotes a bearing and drive housing containing the driving motor for the pinion 21, which is fixedly connected with the ring 46. The first or lower rotating frame 45 possesses radial flanges 48 and, the second or upper rotating frame 46 is provided with flanges 49, which are formed in the same way as the flanges 48. The frame 46 is additionally provided with projections 50 which have a greater radial extension than the flanges 48 or 49. Supporting blocks 51 are mounted approximately in the center of all the four beams and may be pushed in and out.

Figure 12:
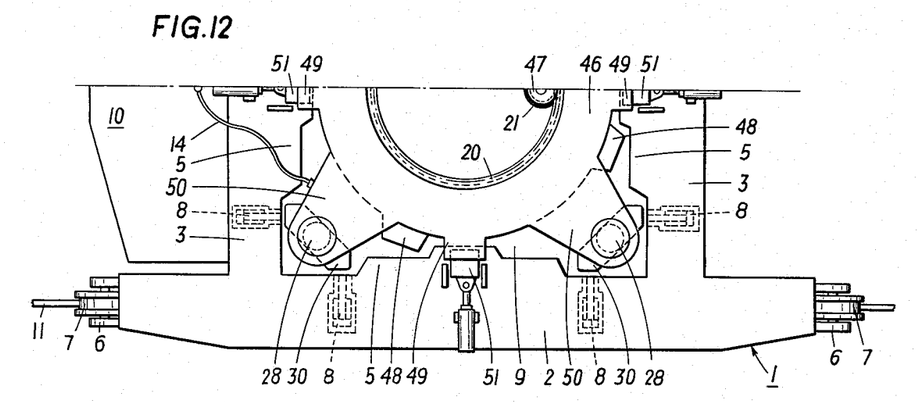
Figure 13:
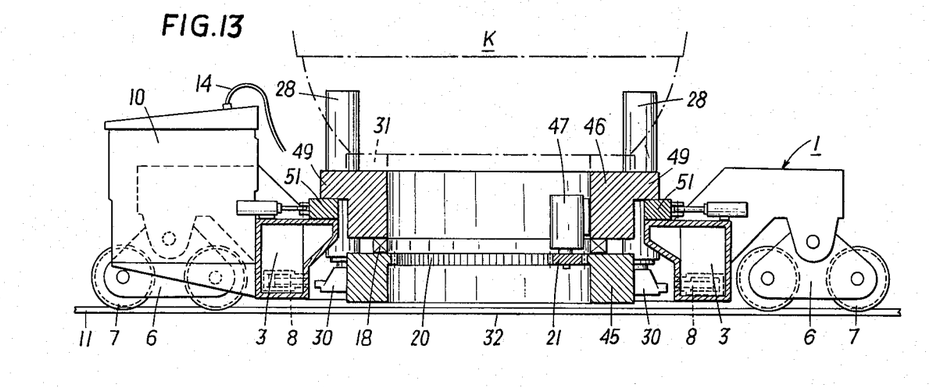
FIGS. 13, 15 are longitudinal sections, each along line II—II of FIG. 12, these Figs. illustrating various stages of the transposition and lifting procedure.
Figure 14:
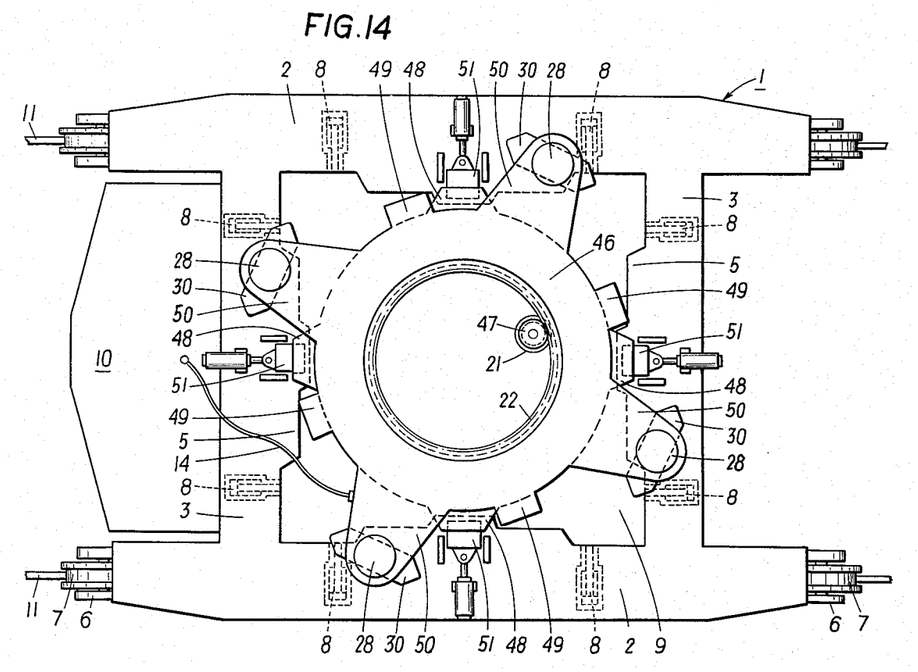
Figure 15:
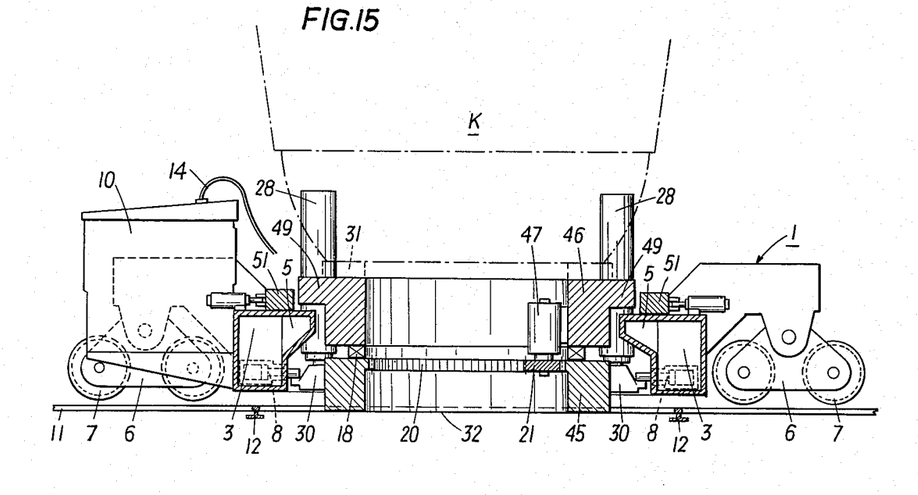

FIGS. 12 and 13 illustrate the position of the vehicle for travel. The frame 46 rests with its flanges 49, upon the supporting blocks 51 and thus upon the travelling frame 1. The lifting of the load is effected as previously described with reference to a vehicle having 3 rotating frames. In particular the lifting devices are pushed out, until the frame 45 stands above the travelling frame. Then the first rotating frame 45 is turned and lowered into a position, in which it rests with its radial flanges 48 upon the travelling frame. Whereupon the lifting means are retracted and the second rotating frame 46 is brought into a position, in which the lifting means 28 are supported by the travelling frame. Then by further pushing out the lifting means, the load is lifted into the final position. FIG. 14 illustrates the plan view with the load being lifted. FIG. 15 illustrates the transposition of the vehicle at a rail intersection. The vehicle, which is in the travelling position, is driven into the rail intersection. Thereafter the lifting means 28 are briefly lifted until the flanges of the upper frame are lifted off the supporting blocks 51. Then the blocks are withdrawn from the range of the flanges. Subsequently the lifting-rotating mechanism is lowered onto the foundation by retracting the lifting means. The bolt-shaped engagement means 8 are then pushed out into the position illustrated in FIG. 4, so that further retraction of the lifting means will cause the engagement means to lift the travelling frame together with the travelling mechanism and the superstructure. This position is illustrated in FIG. 15. Finally, by driving the pinion 21, the vehicle is turned into the desired position and, by the inverted sequence of the above described steps, the vehicle is brought again into the transport position.

The main advantages of the transporting-lifting vehicles of the present invention, compared with other known models, lie in the fact that the lifting means, which belong to the most important elements of the transporting-lifting vehicle, can be built with a short stroke because the total stroke is subdivided. This means that the guiding and stability problems of the lifting means may be diminished considerably. Another advantage is that because of the small height of the lifting means these can be situated considerably closer to the converter than would be possible in the case of lifting means with a long stroke and, hence, considerable height. Because of their short load arms the construction units which transfer the load onto the lifting means may be built relatively light.

An essential advantage of the transporting-lifting vehicles of the present invention also lies in the fact that the lifting means may be used for lifting both the load and the vehicle itself, when the direction of travel is being changed. However this is effected alternatively, so that the lifting means and their drives need be dimensioned only for lifting the loads.

Finally, it should be noted that the transverse shifting and turning of the converter is effected through rotatory movements of easily movable elements, preferably roller-borne elements, so that the are easily needed for it is small. The fact that these areeasily moved and that the unbraked vehicle is also relatively easily moved is particularly utilized when the converter is being introduced into its bearings at the installation place by neutralization of the braking of the rotation and travelling drives. As a consequence the transporting-lifting vehicle, the converter and the carrying ring are subject to less wear and tear.

What I claim is:

1. A transporting and lifting vehicle for a heavy load, e.g. a converter exchange vessel in a steel production plant, comprising a travelling frame and a lifting-rotating mechanism adapted to rest on said travelling frame, but not being mechanically connected to it, said lifting-rotating mechanism comprising:

at least two closed concentric rotating frames for rotating said travelling frame for transposition into different directions of travel and for rotating the load, said rotating frames being connected together in the axial direction and rotatable reltive to each other, said rotating frames having projections that allow them to be individually supportable on said travelling frame when in certain angular positions and passing through said travelling frame when in other angular positions;

means for rotating said rotating frames about a central axis; and extendable and retractable lifting means attached to at least one of said rotating frames for acting against a support surface to lift said rotating frames to a certain lifting height relative to the support surface and to lower them, the certain lifting height being smaller than the total height to which said vehicle can lift the load.

2. The vehicle set forth in claim 1, wherein the lifting-rotating mechanism comprises three closed concentric rotating frames, said three frames being a first (lower) rotating frame, a second (middle) rotating frame and a third (upper) rotating frame.

3. The vehicle set forth in claim 1, wherein the lifting means are hydraulic differential pistons.

4. the vehicle set forth in claim 2, wherein the lifting means are attached to the second (middle) rotating frame.

5. The vehicle set forth in claim 4, wherein the projections of said rotating frames are radial projecting portions, the lifting means being connected with the projecting portions of the second (middle) rotating frame;

wherein the vehicle is movable from a transport position, in which the projecting portions of the third (upper) rotating frame are supported on the travelling frame, to a first lifting phase in which the lifting means uses the ground as its support surface, the projecting portions of the first (lower) rotating frame being supported on the travelling frame after the first lifting phase; and wherein the vehicle is movable after the first lifting phase in a second lifting phase in which the lifting means uses the travelling frame as its support surface.

6. The vehicle set forth in claim 5 wherein the rotating frames are ring-shaped.

7. The vehicle set forth in claim 5 wherein the rotating frames are polygon-shaped.

8. The vehicle set forth in claim 5 wherein the radial projecting portions are radial flanges.

9. The vehicle set forth in claim 1 further including bilaterally acting axial bearings for establishing the axial connection between the rotating frames and wherein the means for rotating comprises tooth-wheel-ring means for selectively rotating the frames together or individually.

10. The vehicle set forth in claim 1 further including engagement means on said travelling frame for temporarily establishing a mechanical connection between said travelling frame and said lifting means in order to transpose said vehicle during a transposing phase, in which said lifting-rotating mechanism is supported by the ground, said lifting means raises said travelling frame from the ground, and said means for rotating move said travelling frame into a new direction.

11. The vehicle set forth in claim 10 wherein the engagement means are pushed out from said travelling frame to engage said lifting means.

12. The vehicle set forth in claim 10 wherein the engagement means swing out from said travelling means to engage said lifting means.

13. The vehicle set forth in claim 1 wherein the lifting means are provided with foot plates.

14. The vehicle set forth in claim 2 wherein the means for rotating includes separate drives for the first and third rotating frames, said separate drives being connected with the second rotating frame and comprising pinions and pertaining motors.

15. The vehicle set forth in claim 14 wherein the separate drives are mounted in a common bearing housing.

16. The vehicle set forth in claim 2 further including a drive for the travelling frame and wherein the drive for the travelling frame and the portion of said means for rotating that rotates the third rotating frame are provided with an automatic brake, said brakes being releasable during the placing of the load onto a stationary load-receiving device.

17. The vehicle set forth in claim 2 further including an adjusting frame for carrying out adjusting movements of the load relative to a load-receiving device and a drive for said adjusting frame, said adjusting frame being eccentrically arranged on the third rotating frame.

18. The vehicle set forth in claim 1 wherein the lifting-rotating mechanism consists of a first rotating frame with radial flanges as the projections and a second rotating frame with radial flanges and projecting portions as the projections, the lifting means being connected with the projecting portions of the second rotating frame;

further including displaceable blocks displaceable from the travelling frame in the direction of the rotating frames;

wherein the vehicle is movable from a transport position, in which the flanges of the second rotating frame rest on said blocks, to a first lifting phase, in which the lifting means uses the ground as its support surface, the flanges of the first rotating frame resting on said blocks after the first lifting phase; and wherein the vehicle is movable after the first lifting phase in a second lifting phase, in which the lifting means uses the travelling frame as its support surface.

19. The vehicle set forth in claim 18, wherein the rotating frames are ring-shaped.

20. The vehicle set forth in claim 18, wherein the rotating frames are polygon-shaped.

* * * * *

UNITED STATES PATENT AND TRADEMARK OFFICE
CERTIFICATE OF CORRECTION

PATENT NO. : 3,918,682
DATED : Nov. 11, 1975
INVENTOR(S) : Friedrich Despalmes

It is certified that error appears in the above-identified patent and that said Letters Patent are hereby corrected as shown below:

Col. 1, line 35, "an angle" should read --any angle--. Col. 3, lines 14 & 15, "travellilng" should read --travelling--. Col. 4, line 26, "drive" should read --drives--; line 63, "not" should read --no--. Col. 5, line 57, "onto" should read --Onto--. Col. 6, line 22, "with the" should read --has--. Col. 7, line 30, after "it" insert a comma. Col. 9, lines 32 & 33, "according to" should read --depending on--; line 58, after "particular" insert a comma; line 62, after "direction" insert a comma. Col. 10, line 1, "ais" should read --axis-- and after "However" insert a comma;

Col. 11, line 32, after "However" insert a comma; line 38, "are easily" should read --force--; line 39, "areeasily" should read --are easily--; line 58, "reltive" should read --relative--. Col. 12, line 12, "the" should read --The--.

Signed and Sealed this sixth Day of April 1976

[SEAL]

Attest:

RUTH C. MASON
*Attesting Officer*

C. MARSHALL DANN
*Commissioner of Patents and Trademarks*